(12) United States Patent
Rowitch et al.

(10) Patent No.: US 7,184,463 B2
(45) Date of Patent: *Feb. 27, 2007

(54) METHOD AND APPARATUS FOR DEMODULATING SIGNALS PROCESSED IN A TRANSMIT DIVERSITY MODE

(75) Inventors: Douglas Neal Rowitch, Del Mar, CA (US); Way-Shing Lee, San Diego, CA (US); Thunyachate Ekvetchavit, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 532 days.

This patent is subject to a terminal disclaimer.

(21) Appl. No.: 10/651,446

(22) Filed: Aug. 28, 2003

(65) Prior Publication Data

US 2004/0042536 A1 Mar. 4, 2004

Related U.S. Application Data

(63) Continuation of application No. 09/594,466, filed on Jun. 14, 2000, now Pat. No. 6,628,702.

(51) Int. Cl.
*H04B 1/69* (2006.01)
*H04B 1/707* (2006.01)
*H04B 1/713* (2006.01)

(52) U.S. Cl. .................... 375/150; 375/148
(58) Field of Classification Search ............. 375/140, 375/142, 143, 147, 150, 152; 370/529, 342, 370/320

See application file for complete search history.

(56) References Cited

U.S. PATENT DOCUMENTS

| 5,490,165 A | * | 2/1996 | Blakeney et al. | 370/335 |
| 5,506,865 A | * | 4/1996 | Weaver, Jr. | 370/335 |
| 6,594,286 B2 | * | 7/2003 | Chen et al. | 370/529 |
| 6,628,702 B1 | * | 9/2003 | Rowitch et al. | 375/150 |

* cited by examiner

*Primary Examiner*—Phuong Phu

(74) *Attorney, Agent, or Firm*—Thomas R. Rouse; Thien T. Nguyen; George T Oehling

(57) ABSTRACT

Demodulator architectures for processing a received signal in a wireless communications system. The demodulator includes a number of correlators coupled to a combiner. Each correlator typically receives and despreads input samples (which are generated from the received signal) with a respective despreading sequence to provide despread samples. Each correlator then decovers the despread samples to provide decovered "half-symbols" and further demodulates the decovered half-symbols with pilot estimates to generate correlated symbols. The decovering is performed with a Walsh symbol having a length (T) that is half the length (2T) of a Walsh symbol used to cover the data symbols in the transmitted signal. The combiner selectively combines correlated symbols from the assigned correlators to provide demodulated symbols. One or more correlators can be assigned to process one or more instances of each transmitted signal. The pilot estimates used within each assigned correlator to demodulate the decovered half-symbols are generated based on the signal instance being processed by that correlator.

15 Claims, 7 Drawing Sheets

METHOD AND APPARATUS FOR DEMODULATING SIGNALS PROCESSED IN A TRANSMIT DIVERSITY MODE

CLAIM OF PRIORITY UNDER 35 U.S.C. §120

The present Application for Patent is a Continuation Application claiming priority to patent application Ser. No. 09/594,466 entitled "Method and Apparatus for Demodulating Signals Processed in a Transmit Diversity Mode" filed Jun. 14, 2000 now U.S. Pat No. 6,628,702, having a common assignee with the present application and hereby expressly incorporated by reference herein.

BACKGROUND OF THE INVENTION

I. Field of the Invention

The present invention relates to data communications. More particularly, the present invention relates to method and apparatus for efficiently demodulating signals that have been processed and transmitted in a diversity mode.

II. Description of the Related Art

In a typical digital communications system, data is processed, modulated, and conditioned at a transmitter unit to generate a modulated signal that is then transmitted to one or more receiver units. The data processing may include, for example, formatting the data into a particular frame format, encoding the formatted data to provide error detection and/or correction at the receiver unit, channelizing (i.e., covering) the coded data, and spreading the channelized data over the system bandwidth. The data processing is typically defined by the system or standard being implemented.

At the receiver unit, the transmitted signal is received, conditioned, demodulated, and digitally processed to recover the transmitted data. The processing at the receiver unit is complementary to that performed at the transmitter unit and may include, for example, despreading the received samples, decovering the despread samples to generate decovered symbols, and decoding the decovered symbols.

In some communications systems, data is processed and redundantly transmitted over two (or possibly more) antennas to provide transmit diversity. The processing may include, for example, covering the data for each antenna with a particular channelization code (e.g., a particular Walsh symbol). In some systems, the data for one or more antennas may also be reordered prior to the channelization. Due to multipath and other phenomena, the transmitted signals may experience different path conditions and may arrive at the receiver unit at different times. If the transmit antennas are spaced sufficiently far apart, then the received signals from the antennas tend to fade independently. Each transmitted signal may also reach the receiver unit via multiple signal paths. The receiver unit is then required to receive, track, and process one or more instances of each transmitted signal, and to combine the results from the processed signal instances to recover the transmitted data. On the downlink, the processing typically includes tracking a pilot that has been transmitted along with the data, and using the recovered pilot to demodulate data samples.

The signal processing (e.g., demodulation) to process multiple transmitted signals, and multiple instances of such signals, can be complicated. Moreover, transmit diversity is typically provided on the downlink, and user terminals are required to support such a mode. The user terminals are typically more impacted by complexity and costs considerations. Therefore, techniques that can be used to efficiently demodulate signals that have been processed and transmitted in a diversity mode are highly desirable.

SUMMARY OF THE INVENTION

The present invention provides demodulator architectures, demodulators, and receiver units for processing signals that have been processed and transmitted in a transmit diversity mode. When operating in the transmit diversity mode, data symbols are typically covered with a channelization code (e.g., a Walsh symbol) having a length (2T) that is twice the length (T) of the channelization code used to cover the data symbols in the non-transmit diversity mode. The demodulator architectures of the invention exploit this property and perform partial processing (e.g., despreading, decovering, pilot demodulation, or a combination thereof) on each fraction of a channelization symbol period of 2T. The processed "partial-symbols" are then appropriately combined to generate the demodulated symbols. By performing partial processing on each fraction (e.g., each half) of the symbol period of 2T, computational complexity and costs can be reduced and performance may be improved. For example, with the present invention, the pilot demodulation in each assigned correlator (i.e., finger) can be performed based only on pilot estimates generated by that correlator, whereas conventional techniques may require pilots from multiple correlators. Other advantages are described below.

An embodiment of the invention provides a demodulator for processing a received signal in a wireless communications system. The demodulator includes a number of correlators coupled to a combiner. Each correlator typically receives and despreads input samples with a respective despreading sequence to provide despread samples. The input samples are generated from the received signal. Each correlator then decovers the despread samples to provide decovered "partial-symbols" and further demodulates the decovered partial-symbols with pilot estimates to generate correlated symbols. The decovering is performed with a channelization symbol (e.g., a Walsh symbol) having a length (e.g., T) that is a fraction (e.g., half) the length 2T of the channelization symbol used to cover the data symbols in the received signal. The combiner receives and selectively combines correlated symbols from the assigned correlators to provide demodulated symbols.

In the transmit diversity mode of a CDMA-2000 or W-CDMA standard (which are identified below), the received signal includes a pair of signals transmitted from a pair of antennas. One or more correlators can then be assigned to process at one or more instances of each transmitted signal. Each assigned correlator processes the received signal to recover pilot estimates corresponding to the signal instance being processed. The pilot estimates are then used within the assigned correlator to demodulate the decovered partial-symbols.

A specific embodiment of the invention provides a demodulator that includes a number of correlators coupled to a combiner. Each correlator typically includes a despreader, a decover element, a complex multiplier, and a switch coupled in series. The despreader receives and despreads input samples with a particular despreading sequence to provide despread samples, and the decover element decovers the despread samples to provide pairs of decovered half-symbols. The decovering is performed with a Walsh symbol W having a length (T) that is half the length (2T) of a Walsh symbol $W_{STS}$ used to cover the data in the received signal. (Space-Time Spreading (STS) is a transmit diversity mode defined by the CDMA-2000 standard.) One pair of decovered half-symbols is provided for each Walsh symbol period of 2T. The complex multiplier then demodulates the decovered half-symbols with a pilot recovered by the correlator to provide demodulated half-symbols.

The switch provides a first combination of decovered half-symbols for each Walsh symbol period of 2T in a first (e.g., even) symbol stream and a second combination of decovered half-symbols for each Walsh symbol period of 2T in a second (e.g., odd) symbol stream. The combiner combines the first symbol streams from the correlators to provide a first (even) output symbol stream, and further combines the second symbol streams from the correlators to provide a second (odd) output symbol stream.

In one design of this specific embodiment, the multiplier in each correlator performs a dot product and a cross product between the decovered half-symbols and the pilot to provide "dot" symbols and "cross" symbols, respectively. The combiner can then be designed to selectively combine the dot and cross symbols for each Walsh symbol period of 2T to provide the demodulated symbols for the first and second output symbol streams.

Another specific embodiment of the invention provides a demodulator that also includes a number of correlators coupled to a combiner. Each correlator typically includes a despreader, a decover element, first and second summers, and first and second complex multipliers. The despreader receives and despreads input samples with a particular despreading sequence to provide despread samples, and the decover element decovers the despread samples to provide pairs of decovered half-symbols. Again, the decovering is performed with a Walsh symbol W having a length (T) that is half the length (2T) of a Walsh symbol $W_{STS}$ used to cover data symbols in the received signal, and one pair of decovered half-symbols is generated for each Walsh symbol period of 2T.

Each correlator typically further includes a switch coupled to the decover element. The switch provides decovered half-symbols corresponding to the first half of the Walsh symbol period of 2T to a first output and decovered half-symbols corresponding to the second half of the Walsh symbol period of 2T to a second output. Each summer then operatively couples to the outputs of the switch and combines each pair of decovered half-symbols in a particular manner to provide a decovered symbol. Each multiplier then demodulates the decovered symbols from a respective summer with a respective pilot to provide a respective symbol stream.

The combiner receives the first and second symbol streams from the first and second multipliers, respectively, of each assigned correlator, combines the first symbol streams from all assigned correlators to provide a first output symbol stream, and further combines the second symbol streams from all assigned correlators to provide a second output symbol stream.

Another embodiment of the invention provides a method for processing a received signal in a wireless communications system. The received signal can include a pair of signals transmitted from a pair of antennas. In accordance with the method, input samples are generated from the received signal. At least one signal instance of each transmitted signal is then processed to provide correlated symbols. The processing for each signal instance typically includes despreading the input samples with a particular despreading sequence associated with the signal instance being processed to provide despread samples, decovering the despread samples to generate decovered partial-symbols (e.g., half-symbols), and demodulating the decovered partial-symbols with pilot estimates to generate the correlated symbols for the signal instance. Again, the decovering is performed with a Walsh symbol W having a length (e.g., T) that is a fraction of (e.g., half) the length (2T) of a Walsh symbol $W_{STS}$ used to cover the data in the received signal. The correlated symbols for all signal instances being processed are then selectively combined to provide demodulated symbols.

The invention further provides other demodulator architectures, correlators, demodulators, receiver units, and methods to process signals that have been processed and transmitted in a transmit diversity mode

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
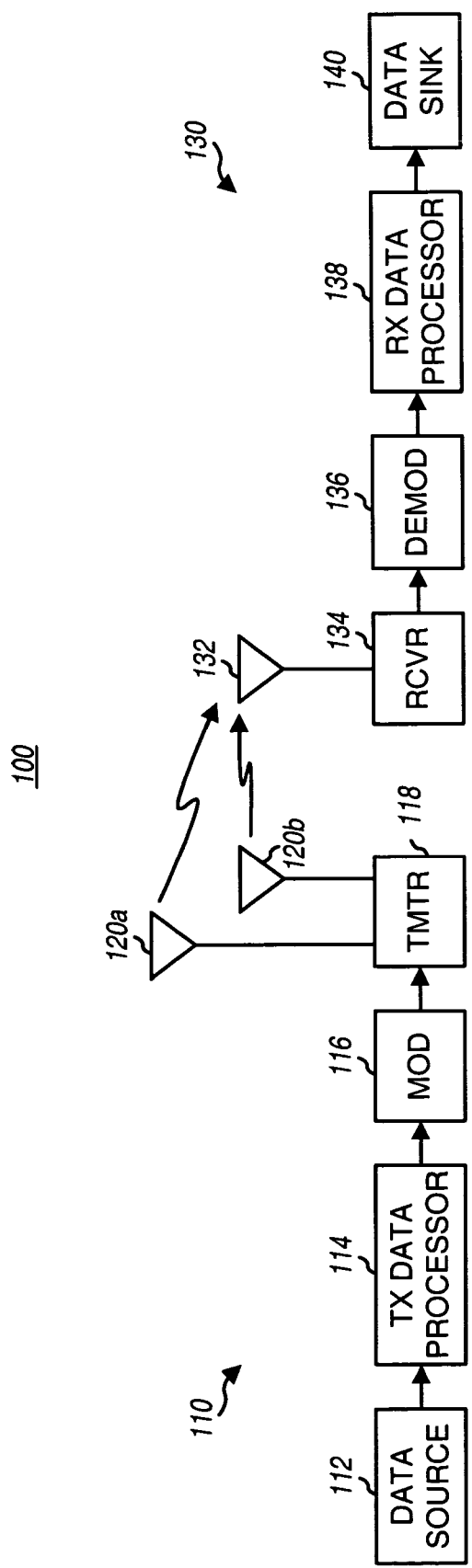
FIG. 1 is a simplified block diagram of a communications system in which the present invention may be implemented.

FIG. 1 is a simplified block diagram of an embodiment of a communications system 100 in which the present invention may be implemented. At a transmitter unit 110, traffic data is sent, typically in frames or packets, from a data source 112 to a transmit (TX) data processor 114 that formats, encodes, and processes the data. TX data processor 114 typically further processes signaling and pilot data, which is then combined (e.g., added, or time division multiplexed) with the processed traffic data to generate composite data. A modulator (MOD) 116 then receives, channelizes (i.e., covers), and spreads the composite data to generate symbols that are then converted to analog signals. The analog signals are filtered, (quadrature) modulated, amplified, and upconverted by a transmitter (TMTR) 118 to generate one or more modulated signals, which are then transmitted via respective antennas 120 to one or more receiver units.

At a receiver unit 130, the transmitted signals are received by an antenna 132 and provided to a receiver (RCVR) 134. Within receiver 134, the received signal is amplified, filtered, downconverted, quadrature demodulated, and digitized to provide inphase (I) and quadrature (Q) samples. A demodulator (DEMOD) 136 then receives, despreads, and decovers the samples to generate decovered symbols. In certain designs, demodulator 136 further demodulates the decovered symbols with pilot estimates to generate demodulated symbols. The demodulated symbols are then decoded and processed by a receive (RX) data processor 138 to recover the transmitted data. The despreading, decovering, decoding, and processing at receiver unit 130 are performed complementary to the spreading, covering, coding, and processing at transmitter unit 110. The recovered data is then provided to a data sink 140.

The signal processing described above supports transmissions of voice, video, packet data, messaging, and other types of communication in one direction. A bi-directional communications system supports two-way data transmission. However, the signal processing for the other direction is not shown in FIG. 1 for simplicity.

Communications system 100 can be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link.

The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM". Another specific CDMA system is disclosed in U.S. Pat. No. 6,574,211, entitled "METHOD AND APPARATUS FOR HIGH RATE PACKET DATA TRANSMISSION," issued Jun. 3, 2003. These patents are assigned to the assignee of the present invention and incorporated herein by reference.

CDMA systems are typically designed to conform to one or more standards such as the "TIA/EIA/IS-95-A Mobile Station-Base Station Compatibility Standard for Dual-Mode Wideband Spread Spectrum Cellular System" (hereinafter referred to as the IS-95-A standard), the "TIA/EIA/IS-98 Recommended Minimum Standard for Dual-Mode Wideband Spread Spectrum Cellular Mobile Station" (hereinafter referred to as the IS98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (hereinafter referred to as the W-CDMA standard), and the "TR-45.5 Physical Layer Standard for cdma2000 Spread Spectrum Systems" (hereinafter referred to as the CDMA-2000 standard). New CDMA standards are continually proposed and adopted for use. These CDMA standards are incorporated herein by reference.

Figure 2:
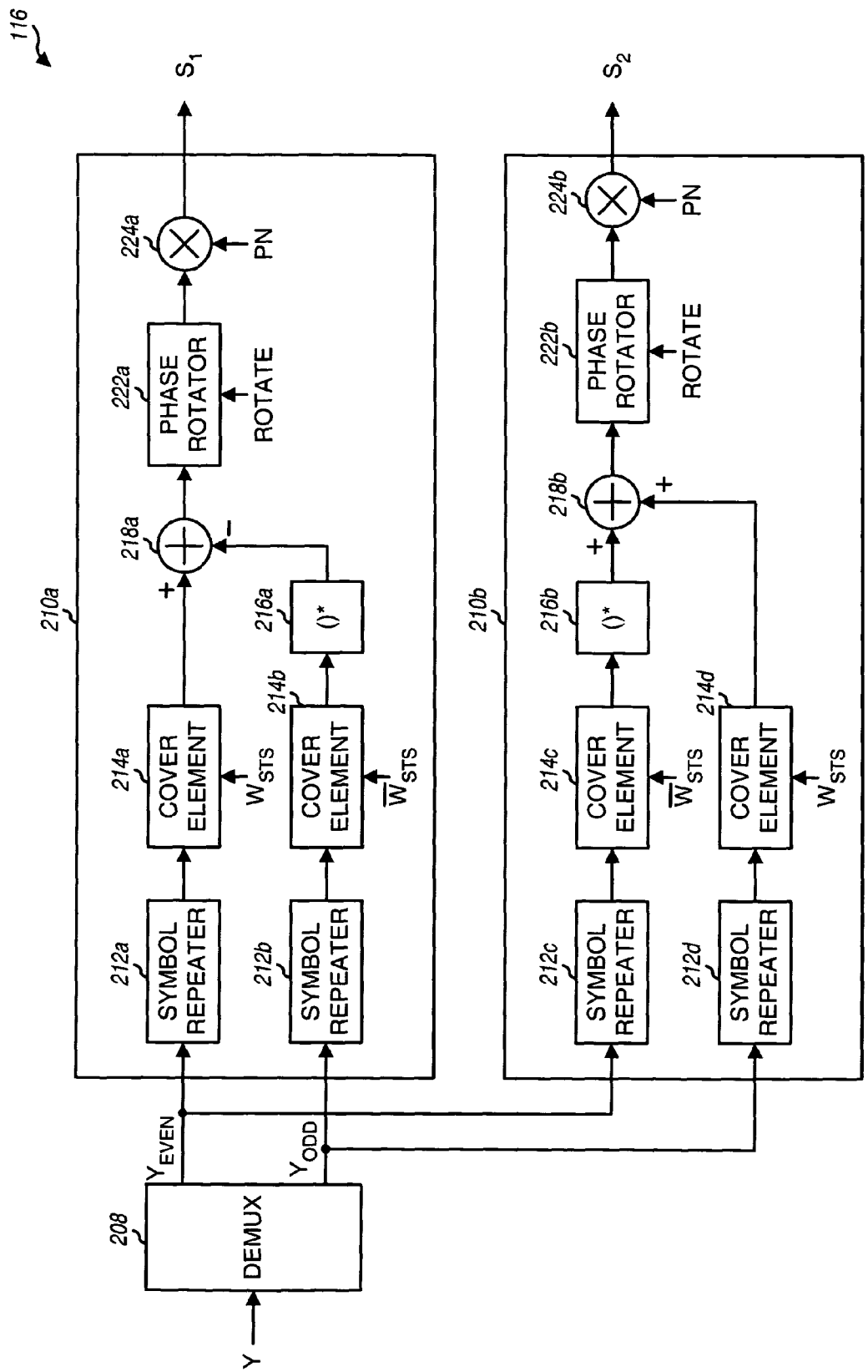
FIG. 2 is a block diagram of a modulator that can be used to process a downlink data transmission in a transmit diversity mode in accordance with CDMA-2000 standard.

FIG. 2 is a block diagram of modulator 116, which can be used to process a downlink data transmission in a Space-Time Spreading transmit diversity mode in accordance with the CDMA-2000 standard (hereinafter referred to as the STS mode). In the STS mode of the CDMA-2000 standard, the data symbols Y to be transmitted are provided to a demultiplexer (DEMUX) 208 and demultiplexed into two complex symbol streams, $Y_{even}$ and $Y_{odd}$, which are then provided to modulators 210a and 210b. The even complex symbol stream $Y_{even}$ comprises the even inphase symbol stream $Y_{I1}$ and the even quadrature symbol stream $Y_{Q1}$. Similarly, the odd complex symbol stream $Y_{odd}$ comprises the odd inphase symbol stream $Y_{I2}$ and the odd quadrature symbol stream $Y_{Q2}$. The even symbol streams comprise "even" indexed data symbols and the odd symbol streams comprise "odd" indexed data symbols. Each modulator 210 performs channelization (i.e., covering) and spreading of the even and odd symbol streams and provides a complex output symbol stream S for a respective antenna.

In the non-transmit diversity (non-TD) mode of the CDMA-2000 standard, complex data symbols are transmitted serially, with each data symbol having a signaling period of T. In the STS mode, two complex data symbols are transmitted in parallel over two antennas, with each data symbol having a signaling period of 2T. As defined by the CDMA-2000 standard, within each modulator 210, one of the complex symbol streams (even or odd) is covered with a Walsh symbol $W_{STS}$ having a length of 2T, and the other complex symbol stream (odd or even) is covered with a complementary Walsh symbol $\overline{W}_{STS}$ having a length of 2T.

Within modulator 210a, the even and odd complex symbol streams, $Y_{even}$ and $Y_{odd}$, are provided to symbol repeaters 212a and 212b, respectively. In the STS mode, each symbol repeater 212 repeats each received data symbol once to double the signaling period from T to 2T. The symbol streams from symbol repeaters 212a and 212b are then provided to cover elements 214a and 214b, respectively, which cover the data symbols with a channelization code associated with the physical channel used for the data transmission. In the STS mode, the channelization code for cover element 214a is the Walsh symbol $W_{STS}$ having a length of 2T, and the channelization code for cover element 214b is the complementary Walsh symbol $\overline{W}_{STS}$ having the same length of 2T. Each cover element 214 covers (e.g., multiplies) each received data symbol with the Walsh symbol $W_{STS}$ or $\overline{W}_{STS}$ in a manner known in the art.

In the STS mode, the complex symbols from cover element 214b are provided to a complex conjugator 216a that conjugates each received symbol. The conjugated symbols from complex conjugator 216a are then provided to a summer 218a and subtracted from the symbols from cover element 214a to provide complex covered symbols. Each complex covered symbol thus includes a pair of data symbols that have been covered with the Walsh symbols $W_{STS}$ and $\overline{W}_{STS}$. The signal processing in the STS mode provides diversity in the transmitted signals, which can result in improved performance.

In the embodiment shown in FIG. 2, the complex covered symbols from summer 218a are provided to a phase rotator 222a. In an embodiment, phase rotator 222a provides a phase rotation of the received complex symbols (e.g., in 90° increments) when enabled by a control signal ROTATE. For example, if the received complex symbols are expressed as $I_C+jQ_C$, phase rotator 222a can provide 90° phase rotation of the complex symbols, which can then be expressed as $-Q_C+jI_C$. The phase rotation allows modulator 210a to account (i.e., compensate) for phase shifts in the modulated signal due to switching or adjustments in the subsequent signal conditioning circuitry within transmitter 118.

A complex multiplier 224a then receives the phase rotated complex symbol stream from phase rotator 222a and a complex spreading sequence PN, spreads the complex symbol stream with the complex spreading sequence, and provides a complex output symbol stream $S_1$. The complex spreading sequence PN is generated in a manner defined by the particular CDMA system or standard being implemented. For the CDMA-2000 system, the complex spreading sequence PN is generated by multiplying the short PN sequences, IPN and QPN, assigned to the transmitting base station with the long PN sequence assigned to the receiving user terminal for which the data transmission is destined.

Figure 3:
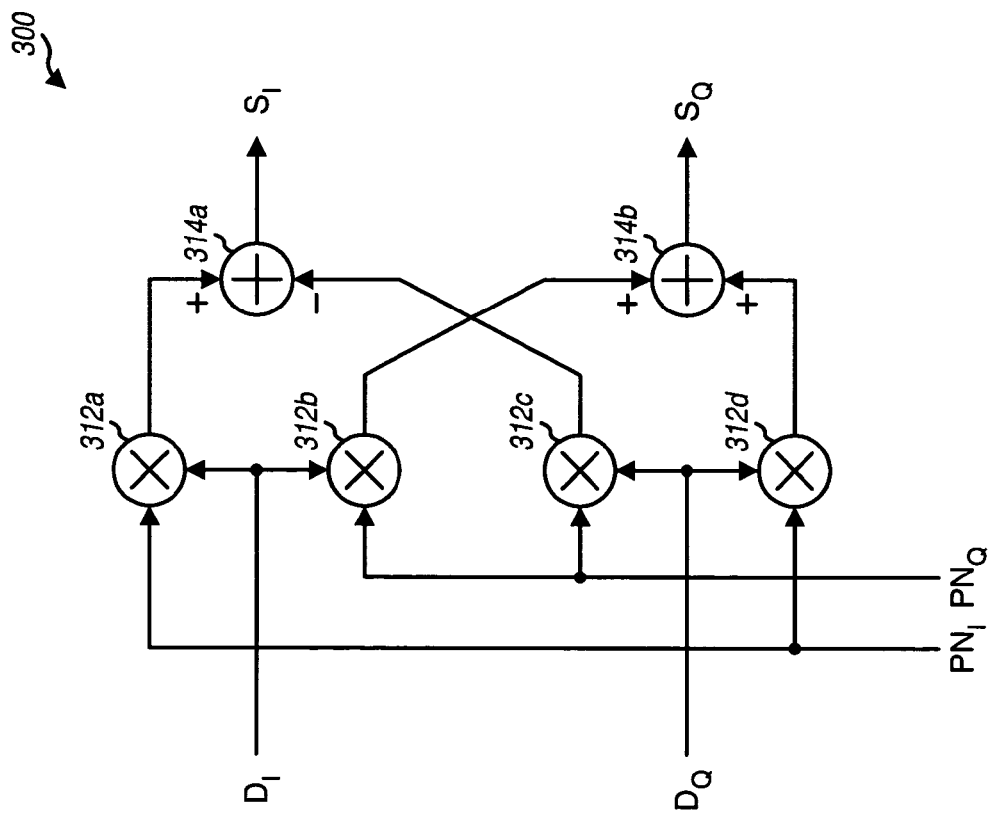
FIG. 3 is a diagram of a complex multiplier.

FIG. 3 is a diagram of a complex multiplier 300 that can be used to implement each complex multiplier 224 in FIG. 2. Complex multiplier 300 performs a complex multiply of the complex data symbols, $D_I+jD_Q$, with the complex spreading sequence, $PN_I+jPN_Q$, to provide complex spread output symbols, $S_I+jS_Q$.

Within complex multiplier 300, the inphase data symbols $D_I$ are provided to multipliers 312a and 312b, and the quadrature data symbols $D_Q$ are provided to multipliers 312c and 312d. Each of the multipliers 312a and 312d also receives the inphase spreading sequence $PN_I$, and each of multipliers 312b and 312c also receives the quadrature spreading sequence $PN_Q$. Each multiplier 312 multiplies the received data symbols with the received spreading sequence and provides respective spread symbols. A summer 314a receives and subtracts the output from multiplier 312c from the output from multiplier 312a to provide the inphase output symbols $S_I$. A summer 314b receives and combines the outputs from multipliers 312b and 312d to provide the quadrature output symbols $S_Q$.

Referring back to FIG. 2, modulator 210b is configured similar to modulator 210a, with three differences. First, in modulator 210b, the complementary Walsh symbol $\overline{W}_{STS}$ is used to cover the even complex symbol stream $Y_{even}$, and the Walsh symbol $W_{STS}$ is used to cover the odd complex symbol stream $Y_{odd}$. Second, complex conjugator 216b couples to the output of cover element 214c (i.e., the processing path for the even complex symbol stream $Y_{even}$). And third, the signs for the inputs of summer 218b are different than the signs for the inputs of summer 216a in modulator 210a.

The processing performed by modulator 116 can be described as follows. Initially, the even and odd complex symbol streams can be expressed as:

$$Y_{even}=Y_{I1}+j\ Y_{Q1}, \text{ and} \qquad \text{Eq (1)}$$

$$Y_{odd}=Y_{I2}+j\ Y_{Q2}. \qquad \text{Eq (2)}$$

As defined by the CDMA-2000 standard, the Walsh symbols $W_{STS}$ and $\overline{W}_{STS}$ are used to cover the even and odd complex symbol streams. Each of these Walsh symbols has a length of 2T and can be generated from a Walsh symbol W of length T as follows:

$$W_{STS}=WW, \text{ and} \qquad \text{Eq (3)}$$

$$\overline{W}_{STS}=W\overline{W},$$

where $\overline{W}=-W$.

If only the data symbols and the covering are considered (i.e., ignoring the PN spreading, phase rotation, transmit gain, pulse shaping, and other signal processing), the complex output symbol stream for antenna 1 can be expressed as:

$$S_1=Y_{even}W\overline{W}-Y^*_{odd}W\overline{W}, \qquad \text{Eq (4)}$$

where the asterisk (*) denotes a complex conjugate operation. Similarly, the complex output symbol stream for antenna 2 can be expressed as:

$$S_2=Y^*_{even}W\overline{W}+Y_{odd}WW. \qquad \text{Eq (5)}$$

The complex output symbol streams, $S_1$ and $S_2$, are subsequently provided to two respective processing paths in transmitter 118. Each processing path filters the inphase and quadrature symbol streams, $S_I$ and $S_Q$, of the complex symbol stream S, modulates the filtered $S_I$ stream with an inphase carrier signal cos $(\omega_c t)$, modulates the filtered $S_Q$ stream with a quadrature carrier signal sin $(\omega_c t)$, sums the two modulated components, and further conditions the resultant signal to generate a modulated signal. In the STS mode, two modulated signals are generated based on two complex symbol streams $S_1$ and $S_2$, and are transmitted from two antennas.

Typically, distinct (i.e., orthogonal) pilots are sent on respective transmit antennas. For example, for the CDMA-2000 system, an unmodulated pilot (using Walsh code 0, 64) is sent on the common antenna and a modulated diversity pilot (using Walsh code 16, 128) is sent on the diversity antenna. The pilots are selected to be orthogonal so that the amplitude and phase of one or both signals transmitted from the respective antennas can be recovered.

The downlink signal processing for the CDMA-2000 standard is described in further detail in the CDMA-2000 standard, and by M. Buehrer et al. in a paper entitled "Proposed Text for Space Time Spreading (STS) v0.3," dated 1999, and incorporated herein by reference. This paper was adopted into the CDMA-2000 standard by the 3GPP2 standard body.

Figure 4:
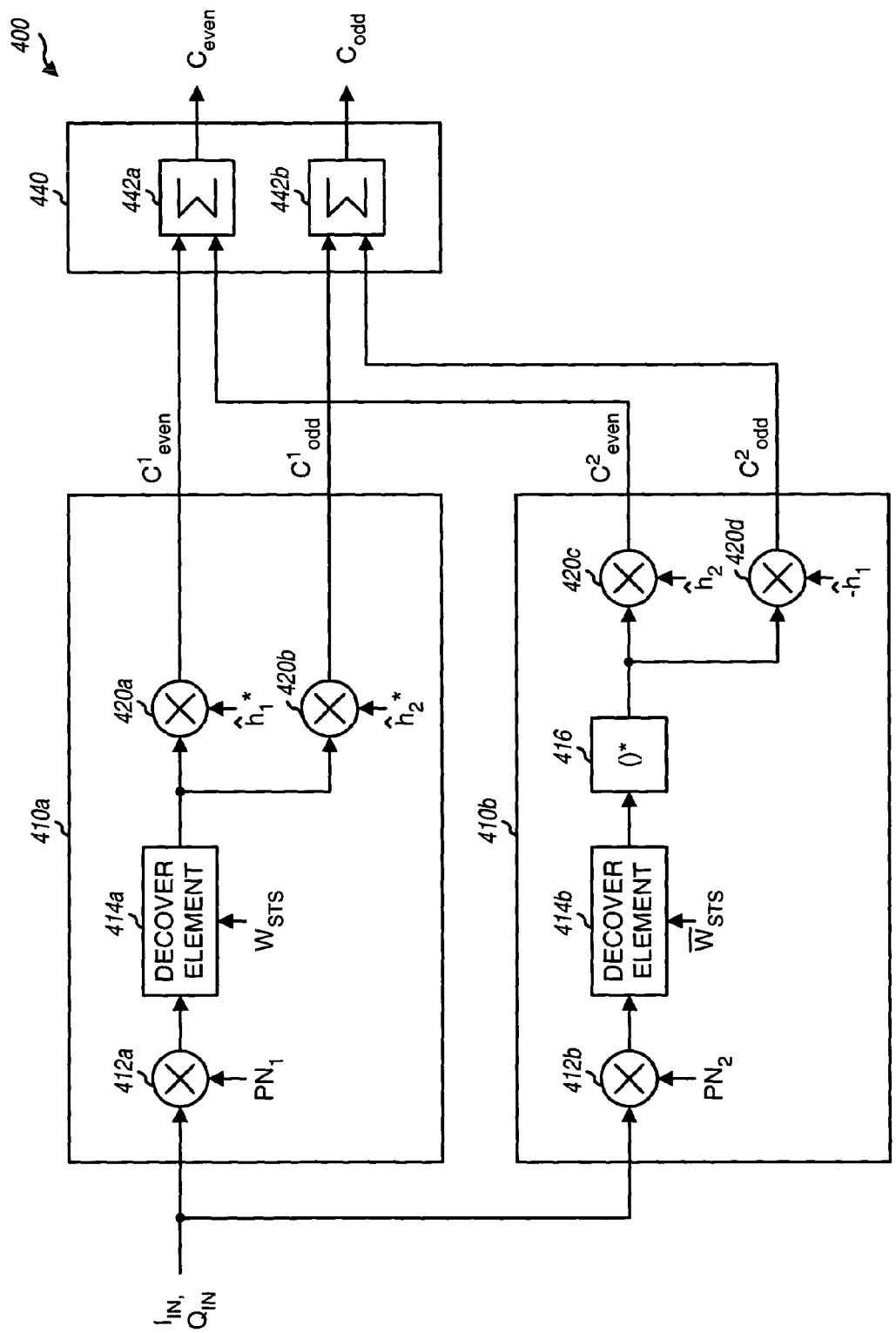
FIG. 4 is a block diagram of a conventional demodulator architecture that can be used to demodulate a downlink data transmission that has been processed in the transmit diversity mode.

FIG. 4 is a block diagram of a conventional demodulator architecture 400 capable of demodulating a downlink data transmission that has been processed in the STS mode of the CDMA-2000 standard. In the STS mode, the received signal includes two modulated signals that have been transmitted from two transmit antennas. The signal from each transmit antenna typically experiences different path conditions, due to the spatial separation of the transmit antennas, and arrives at the receiver unit distorted by the particular path conditions. At the receiver unit, two or more correlators (i.e., fingers) are used to receive and demodulate the two transmitted signals. The demodulated symbols from the correlators are then combined to recover the transmitted symbols.

Initially, the received signal is conditioned (e.g., amplified, filtered, downconverted, quadrature demodulated, and so on) and digitized to provide a complex sample stream comprised of inphase samples $I_{IN}$ and quadrature samples $Q_{IN}$. The complex sample stream is provided to each correlator assigned to process the received signal. Each correlator receives, tracks, and processes a respective instance (i.e., a particular multipath) of the signal from one of the transmit antennas.

As shown in FIG. 4, a correlator 410a is assigned to receive and process the signal from the first transmit antenna, and a correlator 410b is assigned to receive and process the signal from the second transmit antenna. Within correlator 410a, the complex received samples (i.e., $I_{IN}+jQ_{IN}$) are provided to a complex multiplier 412a that also receives a complex despreading sequence $PN_1$ (i.e., $PN_1=PN_{I1}+jPN_{Q1}$) having a particular time offset assigned to correlator 410a and matching the time delay of the signal instance being processed. Complex multiplier 412a despreads the complex samples with the $PN_1$ sequence and provides the complex despread samples (i.e., $I_{D1}+jQ_{D1}$) to a decover element 414a. Decover element 414a decovers the complex received samples with the Walsh symbol $W_{STS}$ and provides complex decovered symbols to each of the complex multipliers 420a and 420b. The decovering is achieved by multiplying the inphase (and quadrature) samples with the Walsh symbol $W_{STS}$ and accumulating the results over the length (2T) of the Walsh symbol $W_{STS}$ to provide inphase (and quadrature) decovered symbols.

Complex multiplier 420a then demodulates the complex decovered symbols with a conjugated complex pilot $\hat{h}^*_1$ (estimated from a pilot transmitted from a first transmit antenna) recovered by correlator 410a. Similarly, complex multiplier 420b demodulates the complex decovered symbols with a conjugated complex pilot $\hat{h}^*_2$ (estimated from a pilot transmitted from a second transmit antenna) recovered by correlator 410b. The output from complex multiplier 420a comprises the even complex symbol stream $C_{even}^1$ that is provided to an accumulator 442a within a combiner 440. Similarly, the output from complex multiplier 420b comprises the odd complex symbol stream $C_{odd}^1$ that is provided to an accumulator 442b within combiner 440.

Within correlator 410b, the complex received samples (i.e., $I_{IN}+jQ_{IN}$) are despread by a complex multiplier 412b with a complex despreading sequence $PN_2$ (i.e., $PN_2=PN_{I2}+jPN_{Q2}$) having a particular time offset assigned to correlator 410b. The complex despread samples (i.e., $I_{D2}+jQ_{D2}$) are decovered by decover element 414b with the complementary Walsh symbol $\overline{W}_{STS}$ and conjugated by a complex conjugator 416. The conjugated symbols are then demodulated with the complex pilot $\hat{h}_2$ by a complex multiplier 420c, and further demodulated with the negative complex pilot $-\hat{h}_1$ by a complex multiplier 420d. The output from complex multiplier 420c comprises the even complex symbol stream $C_{even}^2$ that is provided to accumulator 442a, and the output from complex multiplier 420d comprises the odd complex symbol stream $C_{odd}^2$ that is provided to accumulator 442b.

Accumulator 442a combines the even complex symbol streams, and $C_{even}^1$ and $C_{even}^2$, from correlators 410a and 410b and provides the even output symbol stream $C_{even}$ (i.e., $C_{even}=C_{I1}+jC_{Q1}$). Similarly, accumulator 442b combines the odd complex symbol streams, $C_{odd}^1$ and $C_{odd}^2$, from correlators 410a and 410b and provides the odd output symbol stream $C_{odd}$ ($C_{odd}=C_{I2}+jC_{Q2}$). The symbol streams $C_{I1}$, $C_{Q1}$, $C_{I2}$, and $C_{Q2}$ are estimates of the symbol streams $Y_{I1}$, $Y_{Q1}$, $Y_{I2}$, and $Y_{Q2}$, respectively, generated within modulator 116 in FIG. 2 and expressed in equations (1) and (2).

Demodulator architecture 400 is described in further detail by A. Kogiantis et al. in a paper entitled "Downlink Improvement through Space-Time Spreading," dated Aug. 5, 1999, and incorporated herein by reference. This paper was submitted to the 3GPP2 standard body for adoption into the CDMA-2000 standard.

Demodulator architecture 400 shown in FIG. 4 has several major disadvantages. First, sharing of information between correlators is required to perform the pilot demodulation. Each correlator 410 performs two complex multiplications to achieve the pilot demodulation. The first complex multiplication is performed between the decovered symbols and the complex pilot estimated by that correlator. The second complex multiplication is performed between the decovered symbols and the complex pilot estimated by the other correlator. Demodulator architecture 400 can be modified to share decovered symbols instead of pilot estimates. However, in both cases, the need to share information between correlators is highly undesirable in many circuit designs. Additional circuitry would likely be required to coordinate the sharing of information, which would lead to increased complexity and costs.

Second, if more than one multipath of any of the transmitted signals is processed, it is necessary to pair up correlators with the same path delay to perform the pilot demodulation. This requirement imposes constraints on the use of the correlators and requires coordination between the correlators.

Consequently, as a result of these disadvantages, system performance may be compromised by the use of demodulator architecture 400.

Figure 5:
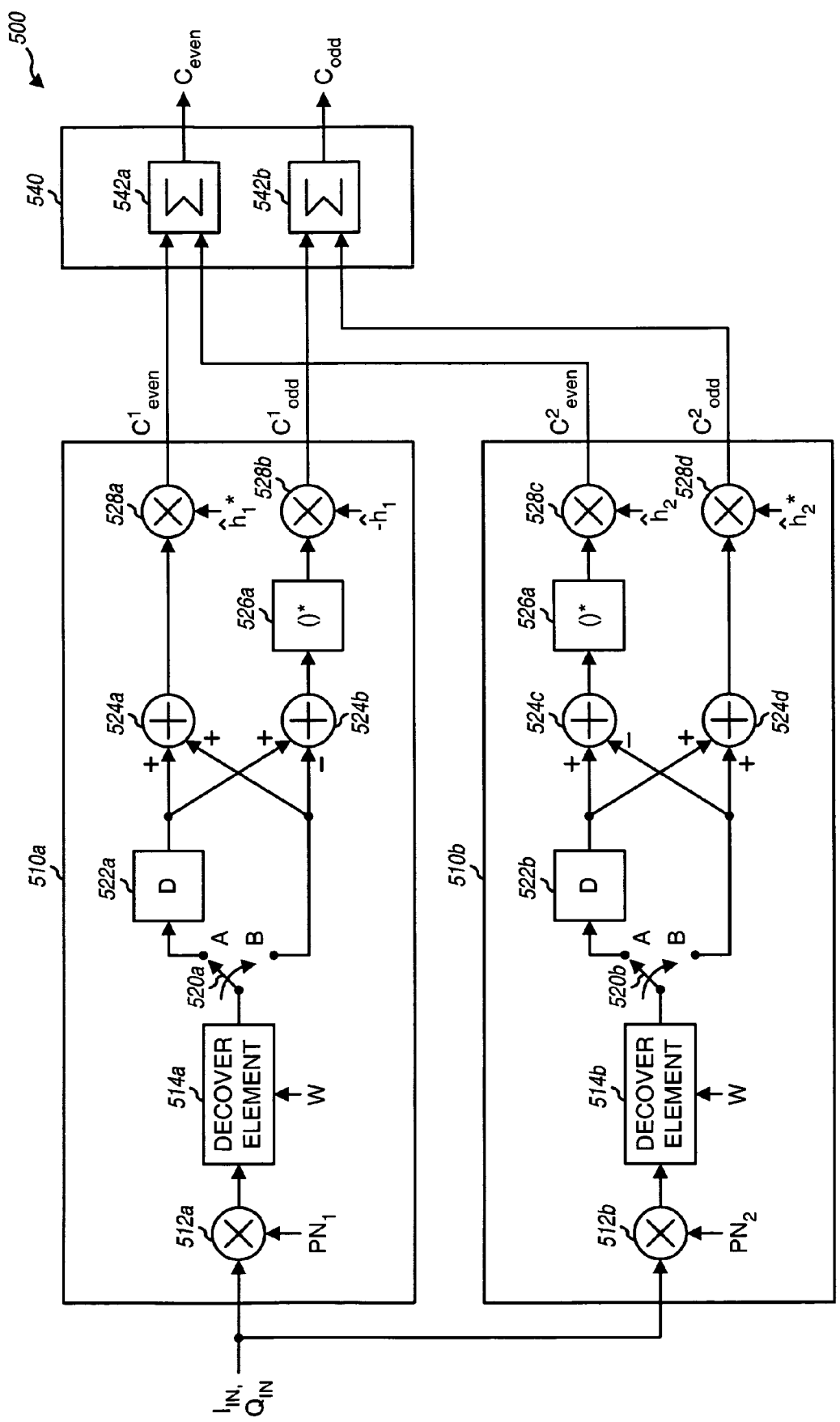
FIGS. 5, 6, and 7 are block diagrams of three specific embodiments of a demodulator architecture of the invention, which are also capable of demodulating the downlink data transmission that has been processed in the transmit diversity mode.

FIG. 5 is a block diagram of a specific embodiment of a demodulator architecture 500 of the invention, which is capable of demodulating a downlink data transmission that has been processed in the STS mode of the CDMA-2000 standard. Initially, the received signal is conditioned and digitized to provide a complex sample stream that is provided to each of correlators 510a and 510b. Each correlator 510 receives, tracks, and demodulates a signal transmitted from one of the transmit antennas.

Within correlator 510a, the complex received samples (i.e., $I_{IN}+jQ_{IN}$) are despread by a complex multiplier 512a with a complex despreading sequence $PN_1$ having a particular time offset assigned to correlator 510a. The complex despread samples (i.e., $I_{D1}+jQ_{D1}$) are then decovered by decover element 514a with a Walsh symbol W having a length of T to provide decovered "half-symbols". The decovering is achieved by multiplying the inphase (and quadrature) samples by the Walsh symbol W and accumulating the resultant samples over the length (T) of the Walsh symbol W.

Referring back to FIG. 2, in the STS mode, each data symbol is covered by the Walsh symbol $W_{STS}$ or $\overline{W}_{STS}$ having a length of 2T, which corresponds to one STS symbol period. Also, referring to equation (3), the Walsh symbols $W_{STS}$ and $\overline{W}_{STS}$ are generated by combining the Walsh symbol W and the complementary Walsh symbol $\overline{W}$. The Walsh symbols W and $\overline{W}$ each has a length of T, which is half the length of the Walsh symbols $W_{STS}$ and $\overline{W}_{STS}$. Each decovered half-symbol from decover element 514 thus corresponds to only half of the STS symbol period.

The complex decovered half-symbols from decover element 514a are provided to a switch 520a. Switch 520a provides the decovered half-symbols corresponding to the first half of the STS symbol period (switch 520a in position A) to a delay element 522a and the decovered half-symbols corresponding to the second half of the STS symbol period (switch 520a in position B) to summers 524a and 524b. Switch 520a can be implemented with a demultiplexer, registers, latches, or some other element. Delay element 522a delays the received half-symbols and provides the delayed half-symbols to summers 524a and 524b. The delay is selected such that the decovered half-symbols for each STS symbol period are aligned in time at the inputs of each of summers 524a and 524b.

For each STS symbol period of 2T (i.e., the length of the Walsh symbols $W_{STS}$ and $\overline{W}_{STS}$) and after the decovered half-symbol corresponding to the second half of the STS symbol period has been received, summer 524a sums the two received half-symbols and provides the decovered symbol to a complex multiplier 528a. Similarly, for each STS symbol period, summer 524b subtracts the half-symbol received from switch 520a from the half-symbol received from delay element 522a and provides the decovered symbol to a complex conjugator 526a. Complex conjugator 526a conjugates the received symbols and provides the conjugated symbols to a complex multiplier 528b.

Complex multiplier 528a demodulates the complex decovered symbols from summer 524a with a conjugated complex pilot $\hat{h}^*_1$ recovered by correlator 510a. Similarly, complex multiplier 528b demodulates the complex decovered symbols from complex conjugator 526a with the negated complex pilot $-\hat{h}_1$. The output from complex multiplier 528a comprises the even complex symbol stream $C^{even1}$ that is provided to an accumulator 542a within a combiner 540, and the output from complex multiplier 528b comprises the odd complex symbol stream $C_{odd}^1$ that is provided to an accumulator 542b within combiner 540.

Correlator 510b performs similar processing as correlator 510a. Within correlator 510b, the complex received samples (i.e., $I_{IN}+jQ_{IN}$) are despread by a complex multiplier 512b with a complex despreading sequence $PN_2$ having a particular time offset assigned to correlator 510b. The complex despread samples are then decovered by decover element 514b with the Walsh symbol W to provide decovered half-symbols.

The complex decovered half-symbols from decover element 514b are provided to a switch 520b, which provides decovered half-symbols corresponding to the first half of the STS symbol period (switch 520b in position A) to a delay element 522b and decovered half-symbols corresponding to the second half of the STS symbol period (switch 520b in position B) to summers 524c and 524d. Delay element 522b delays the received half-symbols and provides the delayed half-symbols to summers 524c and 524d. Again, the delay is selected such that the decovered half-symbols for each STS symbol period are time-aligned at the inputs of each of summers 524c and 524d. For each STS symbol period, summer 524c subtracts the half-symbol received from switch 520b from the half-symbol received from delay element 522b and provides the decovered symbol to a complex conjugator 526b, which conjugates the received symbol and provides the conjugated symbol to a complex multiplier 528c. For each STS symbol period, summer 524d sums the two received half-symbols and provides the decovered symbol to a complex multiplier 528d.

Complex multiplier 528c demodulates the complex decovered symbols from complex conjugator 526b with a complex pilot $\hat{h}_2$ recovered by correlator 510b. Similarly, complex multiplier 528d demodulates the complex decovered symbols from summer 524d with the conjugated complex pilot $\hat{h}^*_2$. The output from complex multiplier 528c comprises the even complex symbol stream $C_{even}^2$ that is provided to accumulator 542a, and the output from complex multiplier 528d comprises the odd complex symbol stream $C_{odd}^2$ that is provided to accumulator 542b.

Accumulator 542a combines the even complex symbol streams, $C_{even}^1$ and $C_{even}^2$, from correlators 510a and 510b and provides the even output symbol stream $C_{even}$ (i.e., $C_{even} = C_{I1} + jC_{Q1}$). Similarly, accumulator 542b combines the odd complex symbol streams, $C_{odd}^1$ and $C_{odd}^2$, from correlators 510a and 510b and provides the odd output symbol stream $C_{odd}$ (i.e., $C_{odd} = C_{I2} + jC_{Q2}$). The symbol streams $C_{I1}$, $C_{Q1}$, $C_{I2}$, and $C_{Q2}$ are estimates of the symbol streams $Y_{I1}$, $Y_{Q1}$, $Y_{I2}$, and $Y_{Q2}$, respectively, generated within modulator 116 in FIG. 2.

The processing performed by demodulator architecture 500 can be analyzed by first characterizing the transmitted symbol streams. The transmitted symbol streams, $S_1$ and $S_2$, in the STS mode are expressed above in equations (4) and (5). The Walsh symbols $W_{STS}$ and $\overline{W}_{STS}$ of length 2T can each be decomposed into a combination of Walsh symbols W and $\overline{W}$, each of length T. The transmitted symbols can be decomposed into a combination of half-symbols transmitted over the first time interval $T_1$ of the STS symbol period and half-symbols transmitted over the second time interval $T_2$ of the STS symbol period.

The transmitted symbols for the first antenna in equation (4) can be expressed as:

$S_1 = S_1^{T1}, S_1^{T2},$ $S_1^{T1} = Y_{even}W - Y^*_{odd}\overline{W},$ and  Eq(6)

$S_1^{T2} = Y_{even}W + Y^*_{odd}\overline{W}.$

Similarly, the transmitted symbols for the second antenna in equation (5) can be expressed as:

$S_2 = S_2^{T1}, S_2^{T2},$ $S_2^{T1} = Y^*_{even}\overline{W} + Y_{odd}W,$ and  Eq(7)

$S_2^{T2} = -Y^*_{even}\overline{W} + Y_{odd}W.$

The signals from the first and second transmit antennas are received with random amplitudes and phases given by the complex values $h_1$ and $h_2$, respectively. The values $h_1$ and $h_2$ characterize the path loss and multipath fading experienced by the transmitted signals. If the noise is ignored, the composite received signal can be expressed as:

$R = S_1 h_1, S_2 h_2 = R^{T1}, R^{T2},$ $R^{T1} = S_1^{T1}h_1 + S_2^{T1}h_2,$ and  Eq(8)

$R^{T2} = S_1^{T2}h_1 + S_2^{T2}h_2,$ where $R^{T1}$ and $R^{T2}$ represent the received symbol waveforms for the first and second time intervals, $T_1$ and $T_2$, respectively, of the STS symbol period. The even complex symbol streams $C_{even}^1$ and $C_{even}^2$ from correlators 510a and 510b, respectively, can be computed as:

$$\begin{aligned} C_{even}^1 &= (\langle R^{T1}, W \rangle + \langle R^{T2}, W \rangle) \hat{h}_1^* \\ &= (\langle (S_1^{T1}h_1 + S_2^{T1}h_2), W \rangle + \langle (S_1^{T2}h_1 + S_2^{T2}h_2), W \rangle) \hat{h}_1^* \\ &= N(((Y_{even} - Y^*_{odd}) + (Y_{even} + Y^*_{odd}))h_1 + \\ &\quad ((Y^*_{even} + Y_{odd}) + (-Y^*_{even} + Y_{odd}))h_2) \hat{h}_1^* \\ &= 2N(Y_{even} h_1 \hat{h}_1^* + Y_{odd} h_2 \hat{h}_1^*) \end{aligned}$$  Eq (9)

$$\begin{aligned} C_{even}^2 &= (\langle R^{T1}, W \rangle - \langle R^{T2}, W \rangle)^* \hat{h}_2 \\ &= (\langle (S_1^{T1}h_1 + S_2^{T1}h_2), W \rangle - \langle (S_1^{T2}h_1 + S_2^{T2}h_2), W \rangle)^* \hat{h}_2 \\ &= N(((Y_{even} - Y^*_{odd}) - (Y_{even} + Y^*_{odd}))^* h_1^* + \\ &\quad ((Y^*_{even} + Y_{odd}) - (-Y^*_{even} + Y_{odd}))^* h_2^*) \hat{h}_2 \\ &= 2N(-Y_{odd} h_1^* \hat{h}_2 + Y_{even} h_2^* \hat{h}_2) \end{aligned}$$  Eq (10)

where $\langle R^{T1}, W \rangle$ denotes the decovering of the symbol waveform $R^{T1}$ by the first correlator with the Walsh symbol W, 2N represents the length of the Walsh symbols $W_{STS}$ and $\overline{W}_{STS}$ (in chips), and $(AB)^* = A^* B^*$. Similarly, the odd complex symbol streams $C_{odd}^1$ and $C_{odd}^2$ from correlators 510a and 510b, respectively, can be computed as:

$$\begin{aligned} C_{odd}^1 &= -(\langle R^{T1}, W \rangle - \langle R^{T2}, W \rangle)^* \hat{h}_1 \\ &= -(\langle (S_1^{T1}h_1 + S_2^{T1}h_2), W \rangle - \langle (S_1^{T2}h_1 + S_2^{T2}h_2), W \rangle)^* \hat{h}_1 \\ &= -N(((Y_{even} - Y^*_{odd}) - (Y_{even} + Y^*_{odd}))^* h_1^* + \\ &\quad ((Y^*_{even} + Y_{odd}) - (-Y^*_{even} + Y_{odd}))^* h_2^*) \hat{h}_1 \\ &= 2N(Y_{odd} h_1^* \hat{h}_1 - Y_{even} h_2^* \hat{h}_1) \end{aligned}$$  Eq (11)

$$\begin{aligned} C_{odd}^2 &= (\langle R^{T1}, W \rangle + \langle R^{T2}, W \rangle) \hat{h}_2^* \\ &= (\langle (S_1^{T1}h_1 + S_2^{T1}h_2), W \rangle + \langle (S_1^{T2}h_1 + S_2^{T2}h_2), W \rangle) \hat{h}_2^* \\ &= N(((Y_{even} - Y^*_{odd}) + (Y_{even} + Y^*_{odd}))h_1 + \\ &\quad ((Y^*_{even} + Y_{odd}) + (-Y^*_{even} + Y_{odd}))h_2) \hat{h}_2^* \\ &= 2N(Y_{even} h_1 \hat{h}_2^* + Y_{odd} h_2 \hat{h}_2^*) \end{aligned}$$  Eq (12)

The even complex symbol stream $C_{even}$ from combiner 542a and the odd complex symbol stream $C_{odd}$ from combiner 542b can be expressed as:

$$C_{even} = C_{even}^1 + C_{even}^2,\qquad\qquad \text{Eq (13)}$$
$$= 2N(Y_{even}h_1\hat{h}_1^* + Y_{odd}h_2\hat{h}_1^*) +$$
$$\quad 2N(-Y_{odd}h_1^*\hat{h}_2 + Y_{even}h_2^*\hat{h}_2),$$
$$= 2N(Y_{even}(h_1\hat{h}_1^* + h_2^*\hat{h}_2) + Y_{odd}(h_2\hat{h}_1^* - h_1^*\hat{h}_2)),$$

$$C_{odd} = C_{odd}^1 + C_{odd}^2,\qquad\qquad \text{Eq (14)}$$
$$= 2N(Y_{odd}h_1^*\hat{h}_1 - Y_{even}h_2^*\hat{h}_1) +$$
$$\quad 2N(Y_{even}h_1\hat{h}_2^* + Y_{odd}h_2\hat{h}_2^*),$$
$$= 2N(Y_{odd}(h_1^*\hat{h}_1 + h_2\hat{h}_2^*) + Y_{even}(h_1\hat{h}_2^* - h_2^*\hat{h}_1)).$$

In each of equations (13) and (14), the first term is the desired signal component and the second term is the undesired component due to cross-talk. If the pilot estimates are accurate (i.e., $\hat{h}_1 = h_1$ and $\hat{h}_2 = h_2$), then equations (13) and (14) simplify as follows $$C_{even} = 2N\, Y_{even}\,(|h_1|^2 + |h_2|^2),\qquad\qquad \text{Eq (15)}$$

$$C_{odd} = 2N\, Y_{odd}\,(|h_1|^2 + |h_2|^2).\qquad\qquad \text{Eq (16)}$$

Demodulator architecture 500 can recover the transmitted symbols if one transmit antenna should fail to operate or if the signal transmitted from one of the antennas experiences a deep fade. As an example, if the second transmit antenna should fail, the received symbol stream can be expressed as:

$$R = S_1 h_1,$$
$$R^{T1} = S_1^{T1} h_1, \text{ and}\qquad\qquad \text{Eq(17)}$$
$$R^{T2} = S_1^{T2} h_1.$$

At the receiver unit, one correlator can be used to receive and process the transmitted signal. The even and odd complex symbol streams, $C_{even}$ and $C_{odd}$, from the assigned correlator can be expressed as:

$$C_{even}^1 = (\langle R^{T1}, W\rangle + \langle R^{T2}, W\rangle)\hat{h}_1^*,\qquad \text{Eq (18)}$$
$$= (\langle (S_1^{T1} h_1), W\rangle + \langle (S_1^{T2} h_1), W\rangle)\hat{h}_1^*,$$
$$= N(((Y_{even} - Y_{odd}^*) + (Y_{even} + Y_{odd}^*))h_1)\hat{h}_1^*,$$
$$= 2N(Y_{even} h_1 \hat{h}_1^*).$$

$$C_{odd}^1 = -(\langle R^{T1}, W\rangle - \langle R^{T2}, W\rangle)^*\hat{h}_1\qquad \text{Eq (19)}$$
$$= -(\langle (S_1^{T1} h_1), W\rangle - \langle (S_1^{T2} h_1), W\rangle)^*\hat{h}_1$$
$$= -N(((Y_{even} - Y_{odd}^*) - (Y_{even} + Y_{odd}^*))^* h_1^*)\hat{h}_1$$
$$= 2N(Y_{odd} h_1^* \hat{h}_1)$$

Again, if the pilot estimate is accurate (i.e., $\hat{h}_1 = h_1$), then equations (18) and (19) simplify as follows:

$$C_{even}^1 = 2N\, Y_{even}(|h_1|^2),$$

$$C_{odd}^1 = 2N\, Y_{odd}\,(|h_1|^2).$$

Demodulator architecture 500 shown in FIG. 5 provides a number of advantages over demodulator architecture 400 shown in FIG. 4. These advantages can result in a simplified design, reduced costs, improved performance, some other advantages, or a combination thereof. Some of these advantages are described below.

First, demodulator architecture 500 does not require the sharing of pilot estimates and data symbols between correlators. Each correlator receives, processes, and demodulates the received sample stream with its own pilot estimate. The autonomous design for the correlators eliminates the need to transfer information between correlators and simplifies the design of the receiver unit that uses demodulator architecture 500.

Second, demodulator architecture 500 does not require correlators to be paired up. This allows for flexibility in assigning correlators to the strongest signal instances, which can lead to improved performance.

Third, demodulator architecture 500 does not require synchronization of the pilots of paired correlators that have unequal path delays. This feature results from the ability of each correlator to operate independently based on the received samples and its own pilot estimate. In contrast, since the correlators are operated in pairs in demodulator architecture 400, the pilots needs to be properly aligned in time to account for any delays between the signal instances being processed by the pair of correlators.

Fourth, demodulator architecture 500 allows for reception of the transmitted symbols if one of the transmit antennas should fail to operate or is in a deep fade. In contrast, demodulator architecture 400 can only recover half of the transmitted symbol should one transmit antenna fail. Demodulator architecture 500 can be used to provide a more robust and reliable communication.

Figure 6:
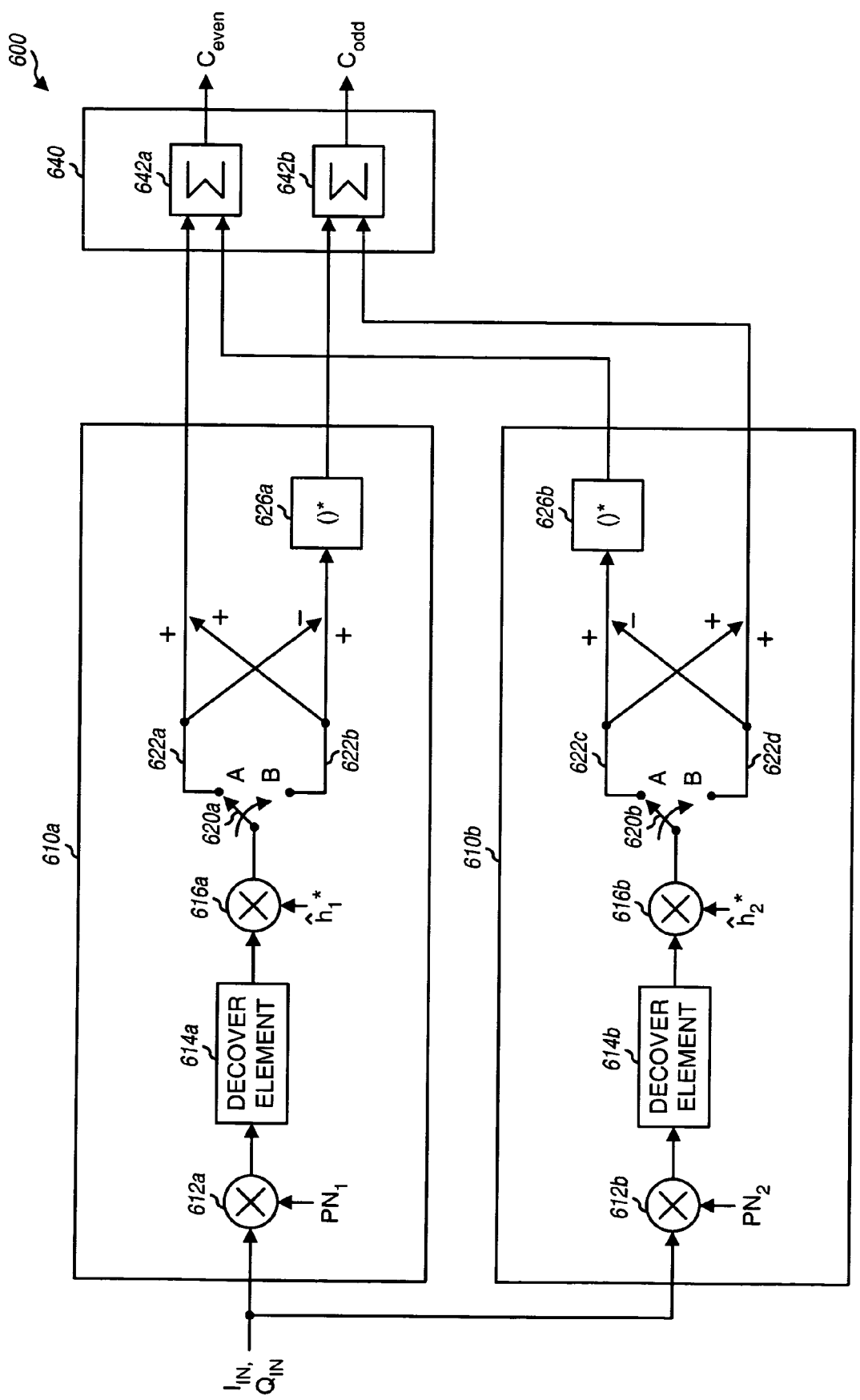

FIG. 6 is a block diagram of another specific embodiment of a demodulator architecture 600 of the invention, which is also capable of demodulating a downlink data transmission that has been processed in the STS mode of the CDMA-2000 standard. The complex sample stream is provided to correlators 610a and 610b, with each correlator 610 operated to receive, track, and demodulate a signal transmitted from one of the transmit antennas.

Within correlator 610a, the complex received samples are despread by a complex multiplier 612a with a despreading sequence $PN_1$ and decovered by a decover element 614a with the Walsh symbol W to provide decovered half-symbols. The decovered half-symbols are then demodulated with a conjugated complex pilot $\hat{h}_1^*$ recovered by correlator 610a to provide demodulated half-symbols, which are then provided to a switch 620a. In the first half of the STS symbol period, switch 620a is in position A, and the demodulated half-symbol is provided to a signal path 622a and the inverted demodulated half-symbol is provided to a signal path 622b. In the second half of the STS symbol period, switch 620a is in position B, and the demodulated half-symbol is provided to signal paths 622a and 622b. Switch 620a can be implemented with a demultiplexer or some other element.

The demodulated half-symbols on signal path 622a are provided to an accumulator 642a within a combiner 640. The demodulated half-symbols on signal path 622b are provided to a complex conjugator 626a, which conjugates the received half-symbols and provides the conjugated half-symbols to an accumulator 642b within combiner 640.

Correlator 610b processes the complex received samples in similar manner as correlator 610a. Specifically, correlator 610b despreads the complex received samples with a despreading sequence $PN_2$, decovers the despread samples with the Walsh symbol W to provide decovered half-symbols, and demodulates the decovered half-symbols with a conjugated complex pilot $\hat{h}^*_2$ recovered by correlator 610b to provide demodulated half-symbols. The demodulated half-symbols corresponding to the first half of the STS symbol period are provided to accumulator 642b, and also conjugated and provided to accumulator 642a. Similarly, the demodulated half-symbols corresponding to the second half of the STS symbol period are provided to accumulator 642b, and also inverted and conjugated and provided to accumulator 642a.

For each STS symbol period, accumulator 642a combines the four received demodulated half-symbols and provides an even output symbol, and accumulator 642b combines the four received demodulated half-symbols to provide an odd output symbol.

Demodulator architecture 600 generates equivalent results as demodulator architecture 500 in FIG. 5. However, by performing the pilot demodulation after the decovering, only one complex multiplier is required. Complex multiplier 616 performs one complex multiply (e.g., one dot product and one cross product) for each half of the STS symbol period (i.e., each period of T). In contrast, each of multipliers 528 in demodulator architecture 500 performs one complex multiply for each STS symbol period of 2T.

Also, the summers (i.e., summers 524) used to combine the decovered half-symbols for each STS symbol period are not needed in demodulator architecture 600 since this function is performed by accumulators 642a and 642b. Each accumulator 642 performs twice the number of read-accumulate-write operations for each STS symbol period as accumulator 542 in demodulator architecture 500.

Figure 7:
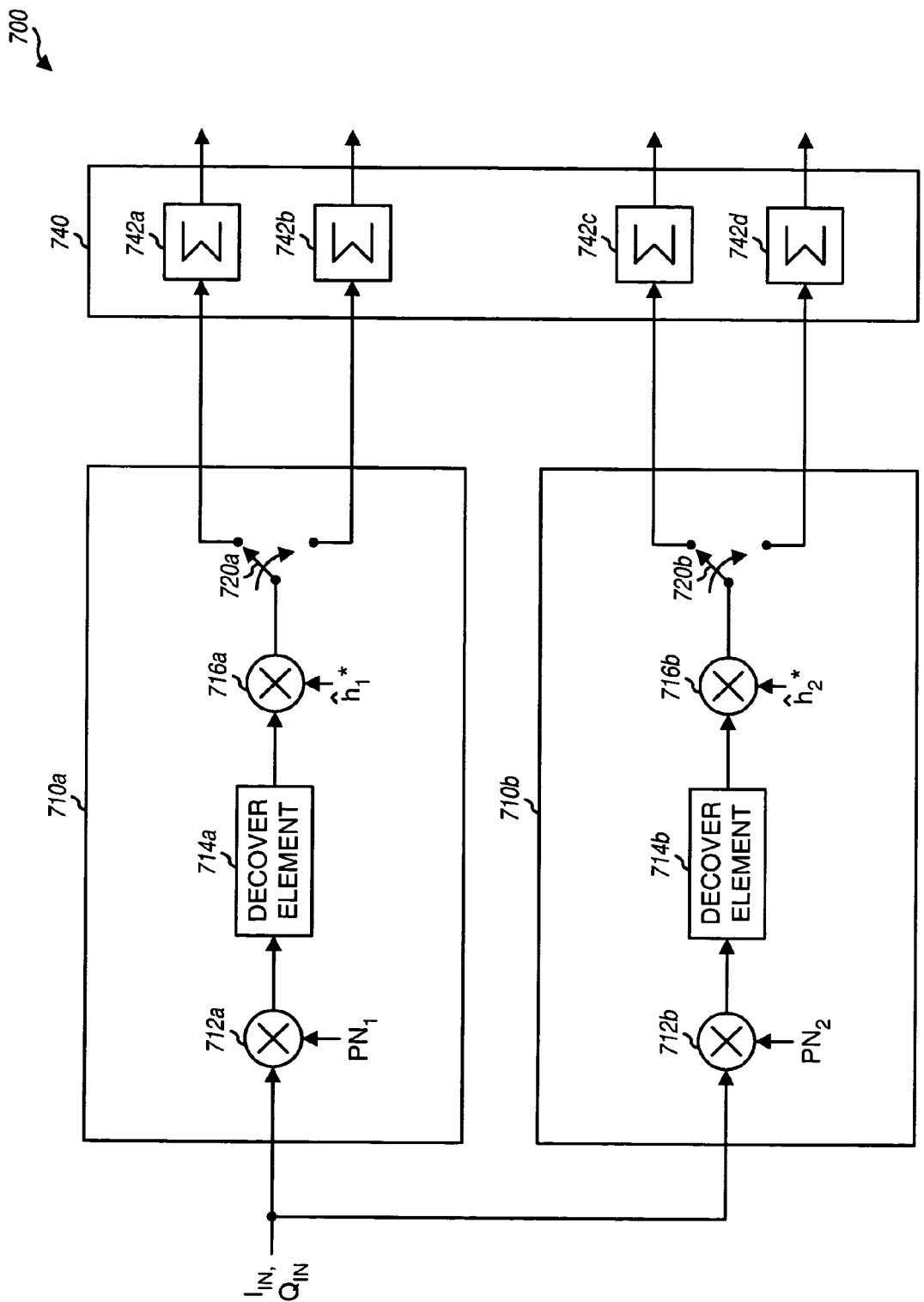

FIG. 7 is a block diagram of yet another specific embodiment of a demodulator architecture 700 of the invention, which is also capable of demodulating a downlink data transmission that has been processed in the STS mode of the CDMA-2000 standard. The complex sample stream is provided to correlators 710a and 710b, with each correlator 710 operated to receive, track, and demodulate a signal transmitted from one of the transmit antennas.

Within each correlator 710, the complex received samples are despread by a complex multiplier 712 with a despreading sequence PN having a particular time offset assigned to that correlator, decovered by a decover element 714 with the Walsh symbol W to provide decovered half-symbols, and demodulated by a complex multiplier 716 with a conjugated complex pilot $\hat{h}^*$ recovered by that correlator to provide demodulated half-symbols.

Within correlator 710a, a switch 720a provides demodulated half-symbols corresponding to the first half of the STS symbol period to an accumulator 742a within a combiner 740 and further provides demodulated half-symbols corresponding to the second half of the STS symbol period to an accumulator 742b within combiner 740. Similarly, within correlator 710b, a switch 720b provides demodulated half-symbols corresponding to the first half of the STS symbol period to an accumulator 742c and demodulated half-symbols corresponding to the second half of the STS symbol period to an accumulator 742d. Each accumulator 742 selectively combines the received half-symbols to provide the output symbols.

In FIG. 7, complex multipliers 716a and 716b are each configured to perform two complex multiplies for each STS symbol period. The complex multiply from correlator n for time interval Tx of the STS symbol period can be expressed as:

$$C^n = (X_I + jX_Q)(P_I - jP_Q), \quad \text{Eq (20)}$$
$$= (X_I P_I + X_Q P_Q) + j(X_Q P_I - X_I P_Q),$$
$$= C_{dot}^{n,Tx} + jC_{cross}^{n,Tx},$$

where $X_I + jX_Q$ is the complex decovered half-symbol to be demodulated, $P_I - jP_Q$ is the conjugated pilot estimate (e.g., $\hat{h}^* = P_I - jP_Q$), and $$C_{dot}^{n,Tx} \text{ and } C_{cross}^{n,Tx}$$

are the dot and cross products, respectively, for the complex multiply.

As shown in equation (20), each complex multiply can be performed with a dot product and a cross product. The four complex multiplies performed by multipliers 716a and 716b for each STS symbol period can be achieved with four dot products and four cross products, which yield four "dot" symbols and four "cross" symbols, respectively. The dot and cross symbols are also referred to as intermediate symbols. In an embodiment, the eight intermediate symbols for each STS symbol period can be stored to eight memory locations and later combined when the symbols are retrieved from memory.

The symbol combination performed by accumulators 742 can be computed as follows. In correlator 710a, the dot and cross products generate the intermediate symbols, $$C_{dot}^{1,T1} \text{ and } C_{cross}^{1,T1},$$

respectively, in the first half of the STS symbol period and the intermediate symbols $$C_{dot}^{1,T2} \text{ and } C_{cross}^{1,T2},$$

respectively, in the second half of the STS symbol period. Similarly, in correlator 710b, the dot and cross products generate the intermediate symbols $$C_{dot}^{2,T1} \text{ and } C_{cross}^{2,T1},$$

respectively, in the first half of the STS symbol period and the intermediate symbols $$C_{dot}^{2,T2} \text{ and } C_{cross}^{2,T2},$$

respectively, in the second half of the STS symbol period.

The even complex output symbols $C_{even}$ can be expressed as:

$$C_{even} = C_{even}^I + jC_{even}^Q, \qquad \text{Eq (21)}$$
$$C_{even}^I = C_{dot}^{1,T1} + C_{dot}^{1,T2} + C_{dot}^{2,T1} - C_{dot}^{2,T2},$$
$$C_{even}^Q = C_{cross}^{1,T1} + C_{cross}^{1,T2} - C_{cross}^{2,T1} + C_{cross}^{2,T2}. \text{ and}$$

Similarly, the odd complex output symbols $C_{odd}$ can be expressed as:

$$C_{odd} = C_{odd}^I + jC_{odd}^Q, \qquad \text{Eq (22)}$$
$$C_{odd}^I = -C_{dot}^{1,T1} + C_{dot}^{1,T2} + C_{dot}^{2,T1} + C_{dot}^{2,T2},$$
$$C_{odd}^Q = C_{cross}^{1,T1} - C_{cross}^{1,T2} + C_{cross}^{2,T1} + C_{cross}^{2,T2}. \text{ and}$$

To further simplify the computations, equations (21) and (22) may be expressed as:

$$C_{even}^I = (C_{dot}^{1,T1} + C_{dot}^{1,T2} + C_{dot}^{2,T1} + C_{dot}^{2,T2}) - 2C_{dot}^{2,T2}, \qquad \text{Eq (23)}$$
$$C_{even}^Q = (C_{cross}^{1,T1} + C_{cross}^{1,T2} + C_{cross}^{2,T1} + C_{cross}^{2,T2}) - 2C_{cross}^{2,T1},$$
$$C_{odd}^I = (C_{dot}^{1,T1} + C_{dot}^{1,T2} + C_{dot}^{2,T1} + C_{dot}^{2,T2}) - 2C_{dot}^{1,T1},$$
$$C_{odd}^Q = (C_{cross}^{1,T1} + C_{cross}^{1,T2} + C_{cross}^{2,T1} + C_{cross}^{2,T2}) - 2C_{cross}^{1,T2}.$$

In equation (23), the quantity within the parenthesis can be computed once for the dot products and once for the cross products for each STS symbol period. Two such combined symbols can be computed for each STS symbol period. For each output symbol (e.g., $C_{even}^1$), a corresponding intermediate symbol (e.g., $$C_{dot}^{2,T2}$$

is scaled by a factor of two (e.g., shifted left by one bit) and subtracted from a corresponding combined symbol (e.g., $$C_{dot}^{1,T1} + C_{dot}^{1,T2} + C_{dot}^{2,T1} + C_{dot}^{2,T2}$$

FIGS. 5, 6, and 7 show three specific embodiments of the present invention. Other embodiments can also be designed and are within the scope of the present invention. Generally, the demodulator architectures of the present invention perform partial processing (e.g., despreading, decovering, pilot demodulation, or a combination thereof) on fractions (e.g., half, quarter, and so on) of the STS symbol period to generate processed "partial-symbols". The processed partial-symbols are then appropriately further processed and combined to generate the output symbols. By performing partial processing on each fraction of the STS symbol period, numerous benefits described above are achieved.

The present invention has been described with designs in which the partial processing is performed on half-symbols. However, partial processing on other fractions of the symbol period may also be performed and are within the scope of the present invention. For example, the partial processing may be performed on quarter symbol period, eighth symbol period, or some other fraction.

In the embodiments shown in FIGS. 5, 6, and 7, two correlators are used to process the two signals transmitted from two antennas. Each of these correlators can be operated to track the timing corresponding to the signal instances being processed.

The signals from the two transmit antennas may also be processed based on the same timing (e.g., the timing of one of the signal instances being processed, or the average timing of the two signal instances, or others). In this implementation, the same symbols are used for both transmitted signals, and the processing can be performed by a single (modified) correlator. The modified correlator can be designed to perform despreading and decovering with a particular time offset, and two pilot demodulation. Common sampling, decimation, despreading, and decovering are performed for both transmitted signals. The use of the same timing may result in higher cancellation of cross-talk, which can provide improved performance.

The demodulator architectures of the invention can be employed in various receiver architectures such as, for example, a rake receiver. The design and operation of a rake receiver for a CDMA system is described in further detail in U.S. Pat. No. 5,764,687, entitled "Mobile demodulator architecture for a spread spectrum multiple access communication system," and U.S. Pat. No. 5,490,165, entitled "Demodulation element assignment in a system capable of receiving multiple signals," both assigned to the assignee of the present invention and incorporated herein by reference.

The rake receiver typically includes many correlators (i.e., fingers) that are assigned to process strong instances of the received signal. The demodulator architectures of the invention allow for easy combining of symbols or half-symbols from multiple assigned correlators. For example, referring back to FIG. 4, the even complex symbols from each assigned correlator are provided to accumulator 442a and the odd complex symbols from each assigned correlator are provided to accumulator 442b. For each STS symbol period, each accumulator 442 combines all received symbols and provides a complex output symbol. Generally, the rake receiver using the demodulator architectures of the invention can be designed to include as many correlators as desired. Each accumulator is then designed to accumulate symbols from all assigned correlators.

The processing to recover the transmitted pilot is known in the art and not described in detail herein. The pilot processing is dependent in the particular CDMA system or standard being implemented. For example, different pilot processing is typically performed depending on whether the pilot is added to (i.e., superimposed over) the data or time division multiplexed with the data. An example of the pilot processing is described in the aforementioned U.S. Pat. Nos. 5,764,687 and 5,490,165.

For clarity, the demodulator architectures, demodulators, and receiver units of the invention have been described specifically for the STS mode defined by the CDMA2000 standard. The invention can also be used in other communications systems that employ the same, similar, or different transmit diversity modes. The demodulator architecture of the invention can be used to provide the basic functionality (e.g., decovering, pilot demodulation, and so on). Modification of the basic functionality and/or additional processing (e.g., combining, reordering of the symbols, and so on) may be implemented to achieve the desired results.

For example, the W-CDMA standard provides a space time block coding transmit antenna diversity (STTD) mode in which symbols are transmitted redundantly over two antennas. In the STTD mode, data symbols are redundantly sent to two modulators, but the symbols provided to the second modulator are reordered, with respect to the symbols provided to the first modulator, in accordance with a particular ordering scheme. To support the STTD mode, demodulator architectures of the invention can be modified to temporarily store the demodulated symbols from the assigned correlators, reorder the symbols in the inverse manner, and combine the symbols to recover the transmitted symbols.

The demodulator architectures described above can be advantageously used in a user terminal (e.g., a mobile unit, a telephone, and so on) of a communications system, and may also be used at a base station. The signal processing for the downlink and uplink may be different and is typically dependent on the particular CDMA standard or system being implemented. Thus, the demodulator architectures are typically adopted especially for the particular application for which it is used.

Some or all of the elements described above for the demodulator architectures of the invention (e.g., the complex multipliers, decover elements, switches, delay elements, summers, combiner, and so on) can be implemented within one or more application specific integrated circuits (ASICs), digital signal processors (DSPs), controllers, micro-controllers, microprocessors, programmable logic devices (PLDs), other electronic units designed to perform the functions described herein, or a combination thereof. Also, some or all of the elements described above can be implemented using software or firmware executed on a processor.

As an example, a demodulator can be designed in which the despreader and decoverer elements for each correlator are implemented in hardware, and the pilot demodulation and symbol accumulation for all correlators are performed by a DSP in a time division multiplexed manner. As another example, one correlator and combiner can be implemented and used to process samples corresponding to various signal instances in a time division multiplexed manner. Numerous other implementations can be contemplated and are within the scope of the present invention.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for a communication system, comprising:
   a decover element for decovering a plurality of received samples to provide decovered half-symbols, wherein the decover element is configured to perform decovering with a decovering channelization symbol having a length (T) that is half the length (2T) of a covering channelization symbol used to cover the received samples; and
   a first multiplier for receiving the decovered half-symbols and pilot symbols to provide demodulated half-symbols.

2. The apparatus of claim 1, wherein the received samples are despread received samples, further comprising:
   a second multiplier for producing the despread received samples.

3. The apparatus of claim 1, further comprising:
   a combiner for combining the demodulated half-symbols received from the first multiplier.

4. The apparatus of claim 3, wherein the combiner comprises:
   a first accumulator for accumulating the demodulated half-symbols corresponding to a first half of a symbol period; and
   a second accumulator for accumulating the demodulated half-symbols corresponding to a second half of the symbol period.

5. The apparatus of claim 1, further comprising:
   a switch for selectively outputting the demodulated half-symbols corresponding to a first half of the symbol period and the demodulated half-symbols corresponding to a second half of the symbol period.

6. A communication system, comprising:
   a transmitter; and
   a receiver for processing a received signal transmitted from the transmitter, said receiver including:
      a decover element for decovering a plurality of received samples to provide decovered half-symbols, wherein the decover element is configured to perform decovering with a decovering channelization symbol having a length (T) that is half the length (2T) of a covering channelization symbol used to cover the received samples; and
      a first multiplier for receiving the decovered half-symbols and pilot symbols to provide demodulated half-symbols.

7. The communication system of claim 6, wherein the received samples are despread received samples, further comprising:
   a second multiplier for producing the despread received samples.

8. The communication system of claim 6, further comprising:
   a combiner for combining the demodulated half-symbols received from the first multiplier.

9. The communication system of claim 8, wherein the combiner comprises:
   a first accumulator for accumulating the demodulated half-symbols corresponding to a first half of a symbol period; and
   a second accumulator for accumulating the demodulated half-symbols corresponding to a second half of the symbol period.

10. The communication system of claim 6, further comprising:
    a switch for selectively outputting the demodulated half-symbols corresponding to a first half of the symbol period and the demodulated half-symbols corresponding to a second half of the symbol period.

11. A method for processing a received signal in a wireless communication system, comprising:
    decovering a plurality of received samples to provide decovered half-symbols, wherein the decovering is performed with a decovering channelization symbol having a length (T) that is half the length (2T) of a covering channelization symbol used to cover the received samples; and
    receiving the decovered half-symbols and pilot symbols to provide demodulated half-symbols by a multiplier.

12. The method of claim 11, further comprising:
    despreading the received samples.

13. The method of claim 11, further comprising:

combining the demodulated half-symbols received from the multiplier.

14. The method of claim 13, wherein said combining further comprises:

accumulating the demodulated half-symbols corresponding to a first half of a symbol period in a first accumulator; and accumulating the demodulated half-symbols corresponding to a second half of the symbol period in a second accumulator.

15. The method of claim 11, further comprising:

selectively outputting the demodulated half-symbols corresponding to a first half of the symbol period and the demodulated half-symbols corresponding to a second half of the symbol period.

* * * * *